(12) United States Patent
Powell et al.

(10) Patent No.: US 8,261,918 B1
(45) Date of Patent: Sep. 11, 2012

(54) POLY-CONTAINER FOR SOLID PHASE-LIQUID PHASE SEPARATION

(76) Inventors: James Robert Powell, Hadley, PA (US); Corey L. Sechler, Greenville, PA (US); Matthew B Wilson, Hermitage, PA (US); Dale W. Deist, Greenville, PA (US)

( * ) Notice: Subject to any disclaimer, the term of this patent is extended or adjusted under 35 U.S.C. 154(b) by 344 days.

(21) Appl. No.: 12/658,189

(22) Filed: Feb. 3, 2010

Related U.S. Application Data

(60) Provisional application No. 61/278,680, filed on Oct. 8, 2009.

(51) Int. Cl.
  *B01D 29/00* (2006.01)
  *B01D 35/00* (2006.01)
  *B01D 29/88* (2006.01)
  *B01D 35/02* (2006.01)
  *B01D 39/00* (2006.01)

(52) U.S. Cl. ........ 210/455; 210/241; 210/248; 210/464; 210/473; 210/477; 210/483

(58) Field of Classification Search .................. 210/455, 210/464, 477
See application file for complete search history.

(56) References Cited

U.S. PATENT DOCUMENTS

| | | | | |
|---|---|---|---|---|
| 3,756,469 A | * | 9/1973 | Clark et al. | 222/105 |
| 5,589,081 A | * | 12/1996 | Harris | 210/804 |
| 5,624,049 A | * | 4/1997 | Kovash et al. | 220/1.5 |
| 5,672,506 A | | 9/1997 | Aoyagi et al. | |
| 5,685,978 A | | 11/1997 | Petrick et al. | |
| 7,078,229 B2 | | 7/2006 | Dvorak | |
| 7,943,051 B2 | * | 5/2011 | Dieziger | 210/767 |

\* cited by examiner

*Primary Examiner* — Benjamin Kurtz
(74) *Attorney, Agent, or Firm* — Richard K Thomson

(57) ABSTRACT

A container for facilitating solid phase-liquid phase separation has all corrosive resistant materials on the liquid-contacting surfaces. A center wall of polyethylene is provided to increase the surface area available for separation. Support structure for the filter medium includes either a poly grate or a poly cuspated plastic or a combination thereof. Poly connectors and drain lines complete the structure ensuring that the container has high durability and will provide a long, corrosion-free life. A specially formulated highly lubricious material (high molecular weight polyethylene) is utilized for the poly walls to enable rapid clean out of the container.

8 Claims, 9 Drawing Sheets

POLY-CONTAINER FOR SOLID PHASE-LIQUID PHASE SEPARATION

Applicants claim the benefit of provisional patent appl. Ser. No. 61/278,680 filed Oct. 8, 2009.

BACKGROUND AND SUMMARY OF THE INVENTION

The present invention is directed to the field of waste management. More particularly, the present invention is directed to solid/liquid separation in both municipal and industrial applications especially for the field of waste management. The present invention is embodied in a de-watering container for transporting and reducing slurries, sludges, and waste streams, the container being made of a high molecular weight polyethylene (HMWPE).

Solid phase-liquid phase separation of materials is an important need in the environmental handling of slurries. This is often referred to simply as de-watering. There are a variety of settings where de-watering is required or desired. These include both municipal and industrial applications such as:
- Environmental emergency response
- Sewage treatment plants
- Environmental disposal requirements that liquid be removed or reduced in landfills to meet federal and state regulations for disposal
- De-watering fly ash at power plants
- Reduction of waste volume from sources like
  - Paper mills
  - Chemical factories
  - Textile mills
  - Pharmaceutical operations
  - Food processing
  - Mining industries and others
- Removal of solids from storm water runoff
- De-watering lagoon sludge
- De-watering grease and grit from retail food effluent streams
- De-watering clarifier ponds at wastewater and water treatment in sludge and septic handling
- Recover the material as a product
- Cleaning drilling mud for reuse in the gas well drilling process, or
- Other needs such as to clarify the aqueous portion of the mixture.

Currently, solid-liquid phase separation is completed by a variety of means including: centrifuges, settling ponds, belt presses, filter presses and de-watering filter containers. All share the objective to reduce sludge to a fraction of original volume, shrinking the handling and disposal costs and returning water or the carrying liquid to a reusable status. Existing de-watering containers usually use gravity or vacuum in concert with a flocculent additive to help coagulate and congeal the separation of solid-liquid phases contained within.

The present invention is directed to a new style of de-watering filter container: an all poly de-watering container. Currently, de-watering containers are made of carbon steel and coated or painted with coatings to protect the steel from corrosion against the corrosive solid-liquid slurries they are exposed to. The coatings, as good as they are, break down or are damaged in handling, causing the containers to corrode/rust so that the containers must be discarded or refurbished to continue to perform satisfactorily. De-watering containers often have a sub base that fits a roll-off truck application for handling and disposing of the de-watered, solid product. De-watering containers are sealed, liquid tight by design. Patent numbers of current steel based products include 4,871,454 and 5,595,654.

The poly dewatering container of the present invention is unique in that it has:
1. an interior of all poly components of container vessel floor and walls which are corrosion-resistant to septic sludges;
2. the partition support for the filter panels is also poly, not steel nor other metal;
3. the filter media is non metal and/or non-corrosive plastic as well; and,
4. the piping fittings through the walls into and out of the container are also poly.

The entire solid-liquid exposed portion of the container is unique in that it is non-corrosive poly. This poly is high molecular weight polyethylene (HMWPE) that is extrusion welded to have a water tight seal. It includes a rubber gasketed tailgate on the gated option design to seal the sludge being de-watered internally. The fasteners inside are non-corrosive stainless steel or poly.

Other features include:
- All internal components of the poly de-watering container are plastic and non-metal (except for stainless steel fasteners).
- This is a non-porous, non-corrosive resistant containment.
- The unit has an operating temperature range from about −30 degrees Fahrenheit (if the liquid can be workable at that temperature) to about +160 degrees Fahrenheit.
- The poly for the container walls is a special (HMWPE) recipe for added slipperiness, non-adherence and shedding of material contents.
  - This slipperiness cleans out several times faster than conventional carbon steel containers with less build-up on the exposed walls.
  - This slipperiness resists the build-up of hard water deposits which is common in conventional steel and metal piping.
- Will not rust and wear when introduced to the same de-watering material contents that corrode carbon steel containers. This also eliminates the need to rebuild or refurbish rusted out carbon steel containers.
- The poly container does not require the harsh, caustic surface preparation of steel containers for paint.
- The poly container does not require the harsh, environmentally unfriendly coatings such as galvanizing, epoxy or urethanes on steel.
- The Poly sheet for the container construction can be thermo-formed and extrusion welded without losing any of the poly strength or release properties.
- The Poly de-watering container is designed with adequate reinforcement for the rigors of industrial-commercial-municipal use in dewatering.
- The Poly de-watering container is designed to be used on available transportation systems such as roll-off units or as custom built transport units.
- The Poly de-watering container does not have the issue of dissimilar metals reaction, anodic or cathodic conductivity corrosion that containers using different metals exhibit.
- The Poly de-watering container uses typical industrial, sealed sliding hinges and latches on its gates and latches to seal liquid tight.
- The Poly de-watering container is lighter than similar sized conventional units providing more useable hauling payload.

The Poly de-watering container uses poly for the partition and space component behind the filter cloth. This includes poly materials such as poly grating or poly cuspated plastic.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
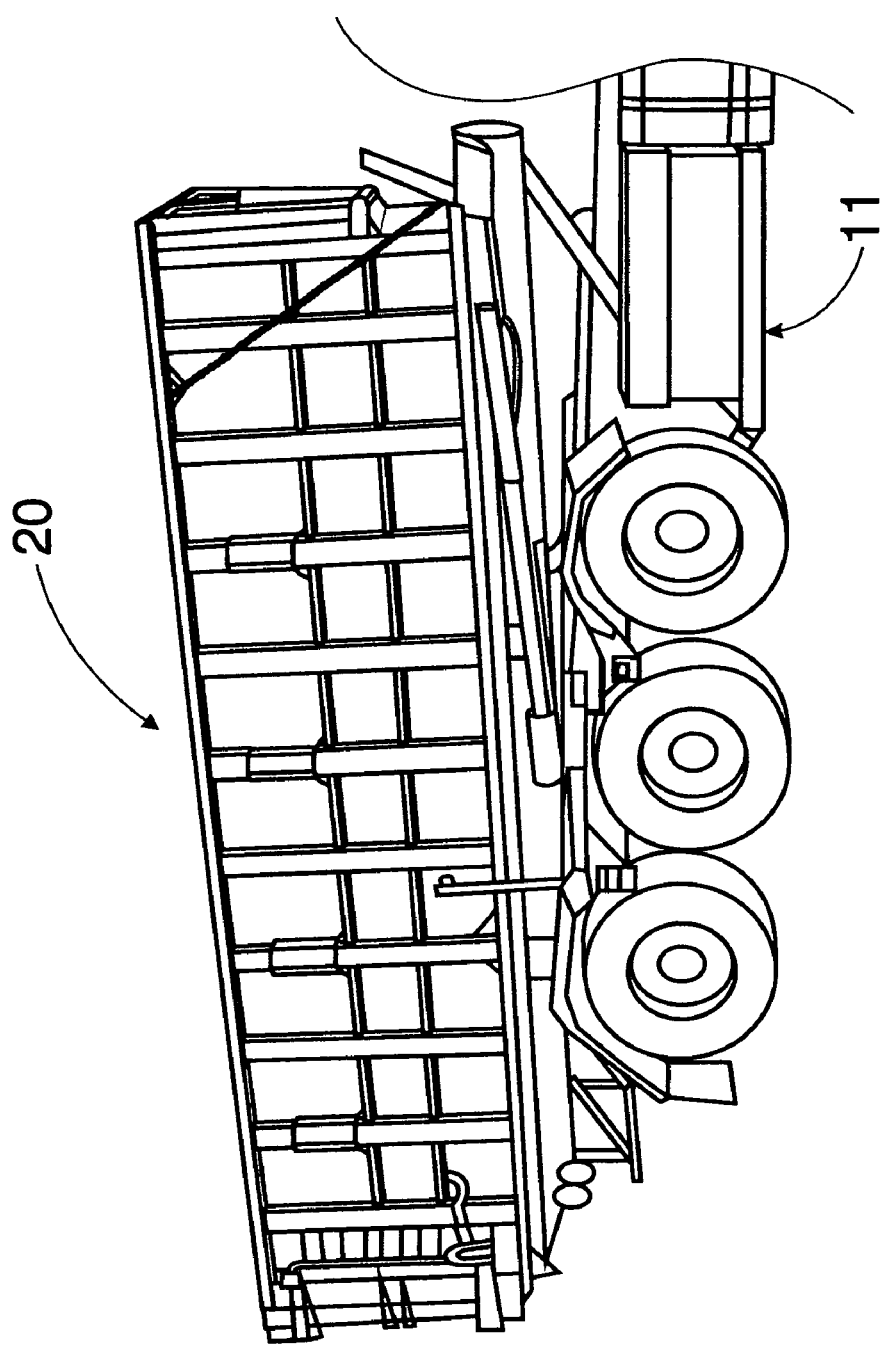
FIG. 1 is a side view of a first embodiment of the de-watering container of the present invention loaded on a truck for transport/use.
Figure 2:
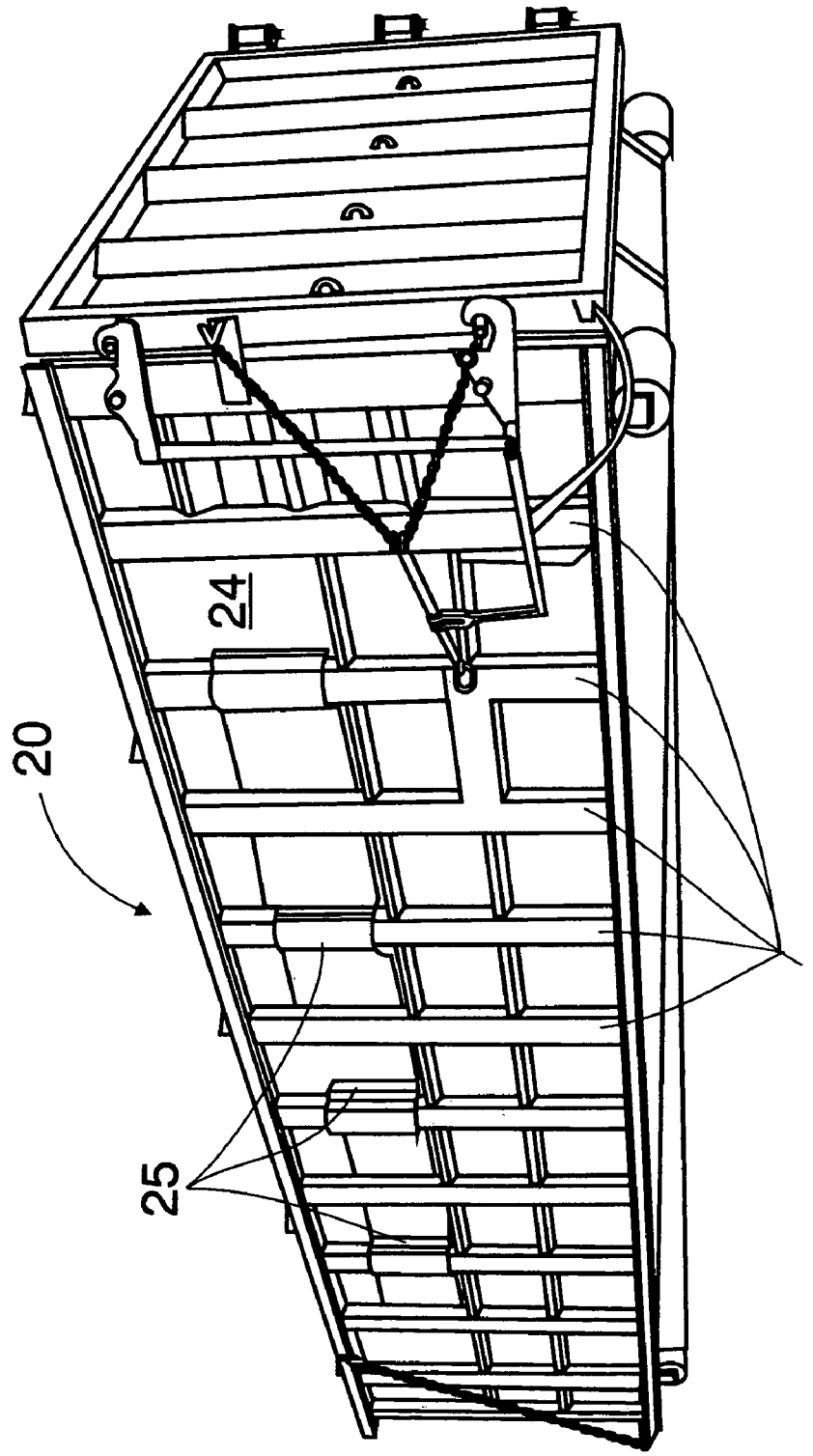
FIG. 2 is a side perspective view of the first embodiment off-loaded from a truck.
Figure 3:
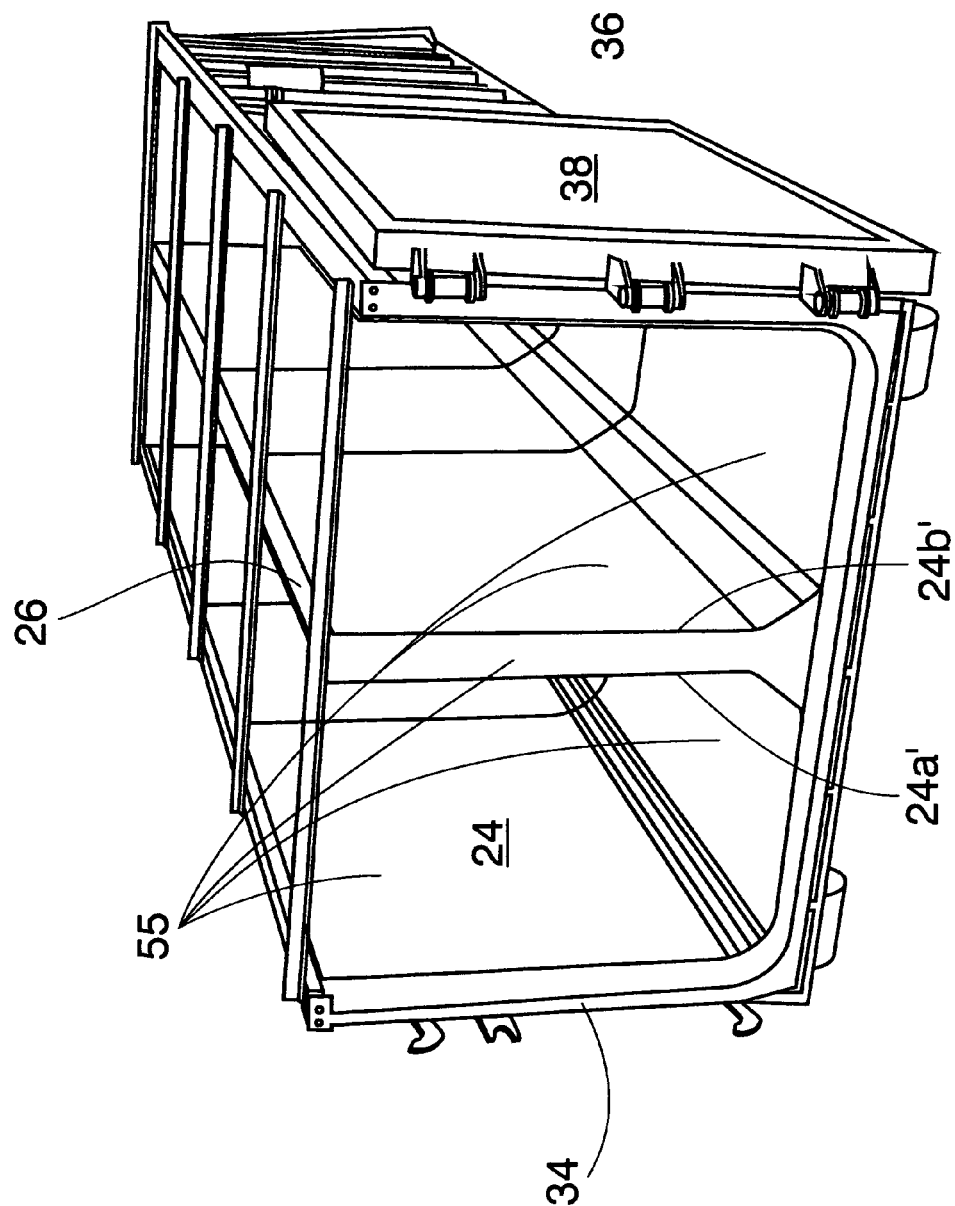
FIG. 3 is a front perspective view of the first embodiment with the hinged door opened.
Figure 8:
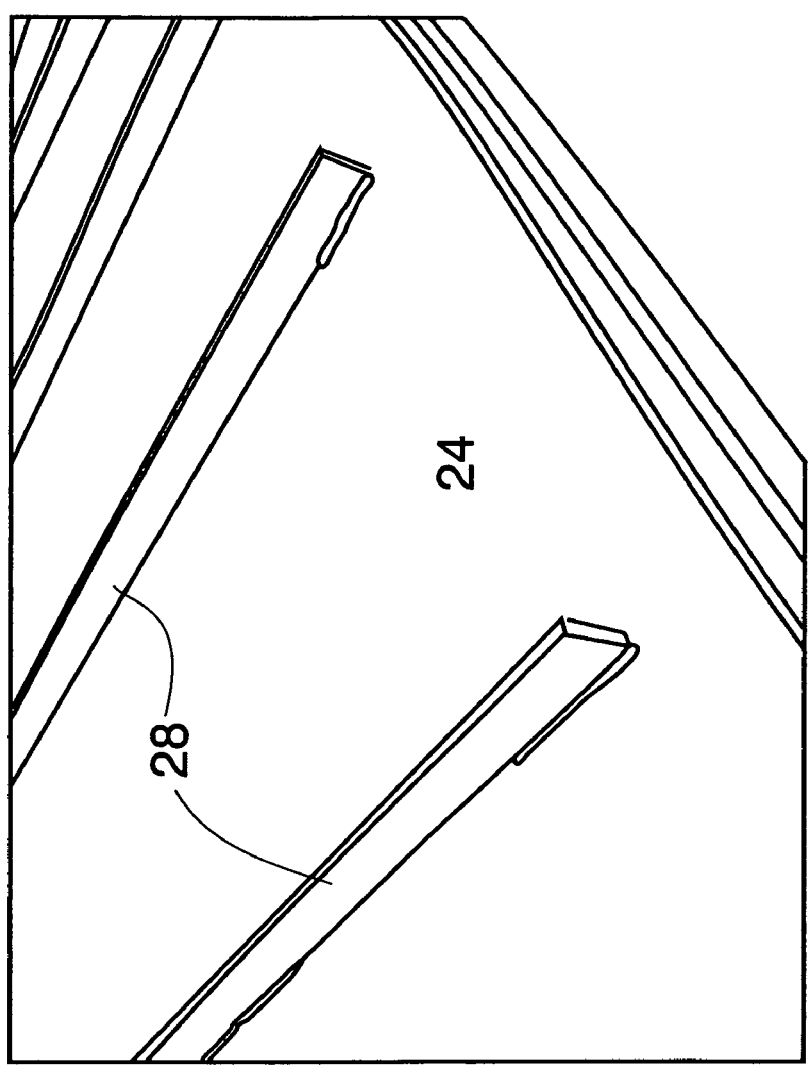
FIG. 8 is a view of the outer poly wall showing the plastic reinforcement ribs which are inside the metallic skeletal grid posts.

The solid phase-liquid phase separator container of the present invention is shown in FIGS. 1-4 generally at 20. Container 20 is configured as a roll-off container to facilitate transport on the bed of a roll-off truck 11 (FIG. 1). Container 20 includes a metallic skeletal grid 22 which defines the envelope of container 20. All metallic surfaces are coated with a coating or layer of paint to inhibit corrosion. Outer walls 24 are polyethylene with stiffening ribs 28 (FIG. 8) on the outer faces. Preferably, walls 24 are made of a specially formulated lubricious high molecular weight polyethylene (HMWPE) and are secured to steel beams of skeletal grid 22 by wraps 25. These wraps are also poly sheets secured to the walls 24 by a poly extrusion welding process. In the preferred embodiment, a central wall 26 is formed of poly, as well. Wall 26 is formed by assembling sheets 24a' and 24b' using the same poly extrusion welding process. All internal materials used within the container 20 are corrosion resistant. An elastomeric seal 36 is affixed to the internal face of hinged door 38 (FIG. 3). Compression of seal 36 on door 38 against poly surface 34 inhibits leakage of fluids out of container 20.

Figure 4:
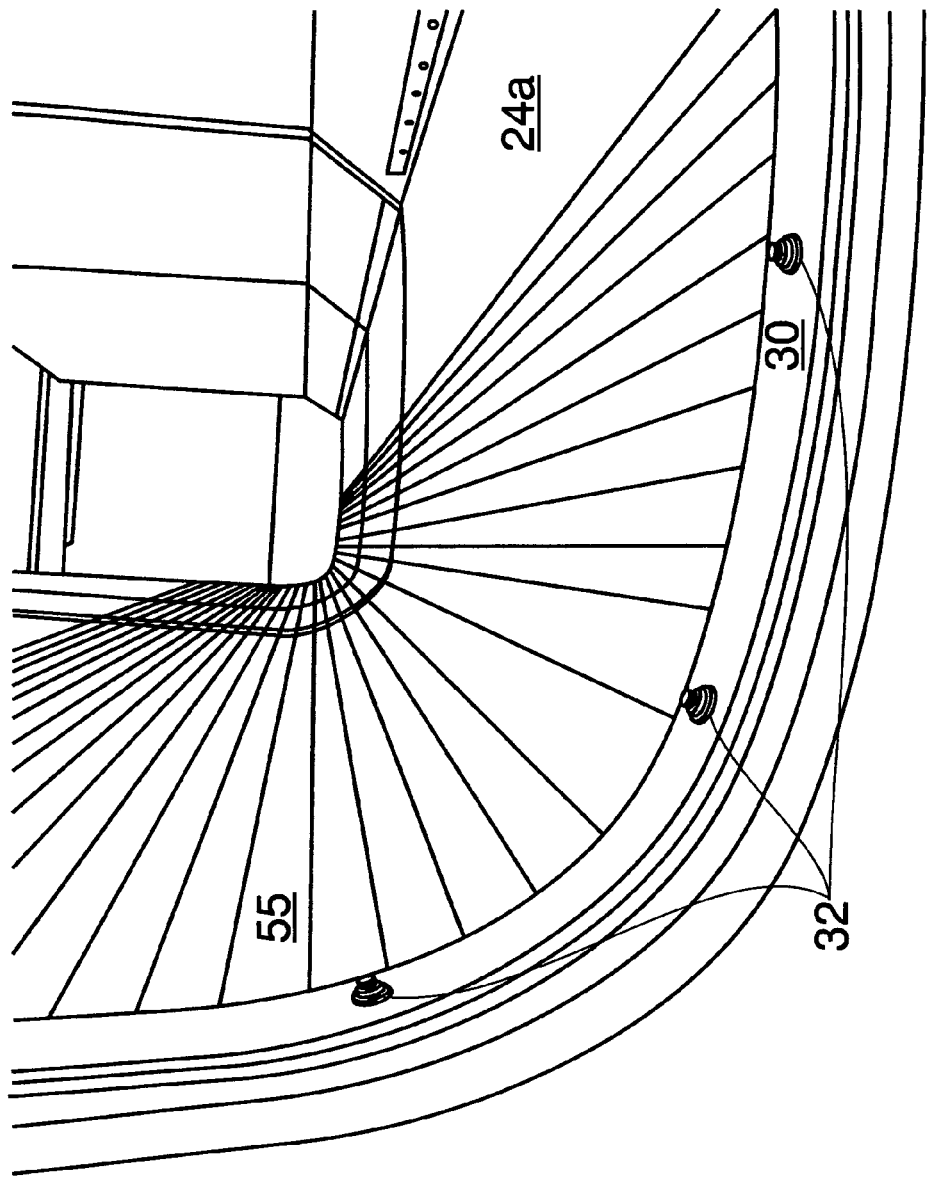
FIG. 4 is a detailed end view of the internal compartment of the first embodiment.
Figure 5:
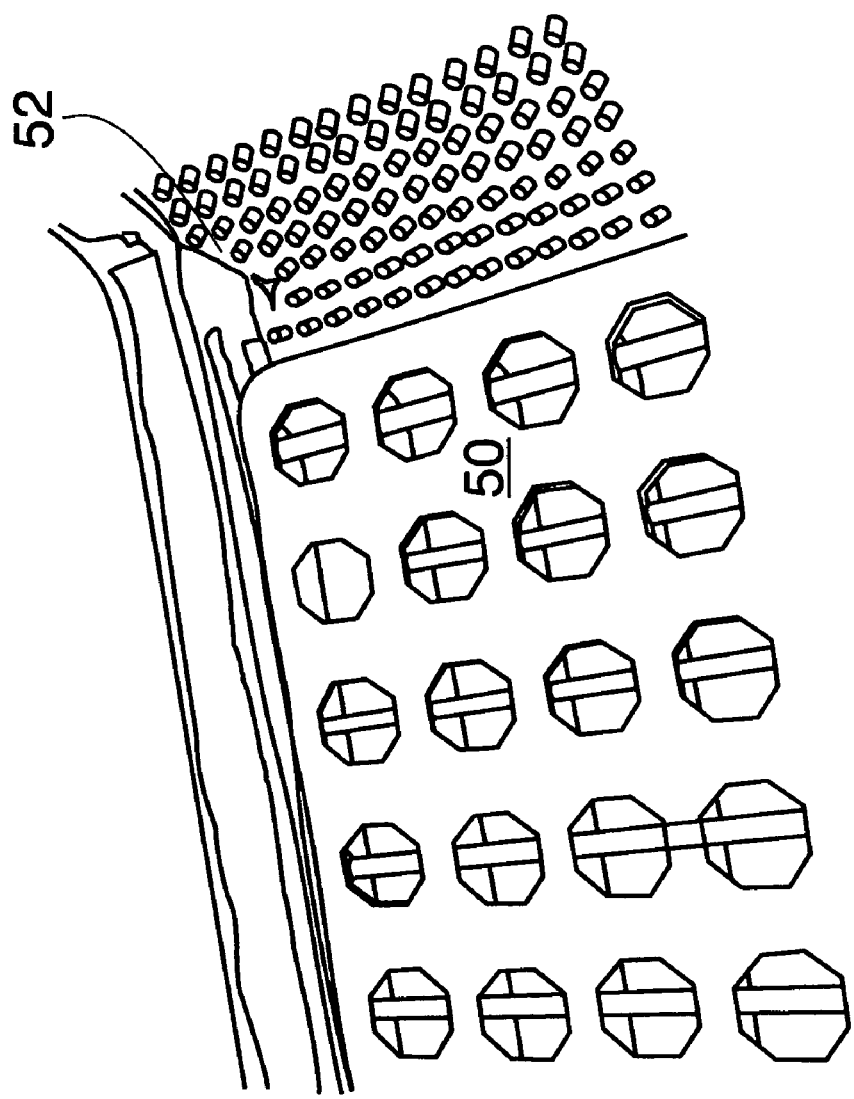
FIG. 5 is a detailed top perspective view of the container prior to insertion of the poly filter cloth showing both materials used for liquid transfer including polyethylene grate (floor) and a layer of polyethylene cuspated plastic (side wall)
Figure 6:
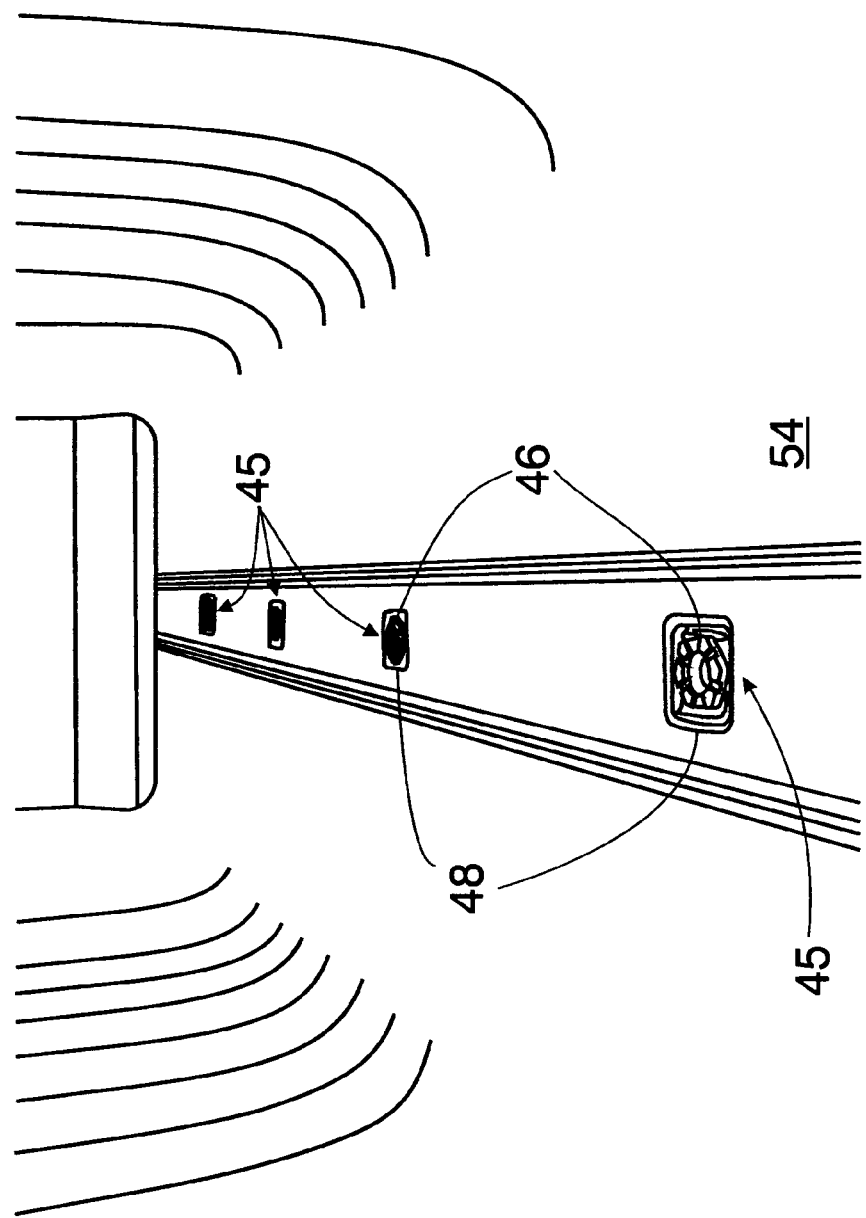
FIG. 6 is a view of the poly floor beneath the inner poly wall.
Figure 7:
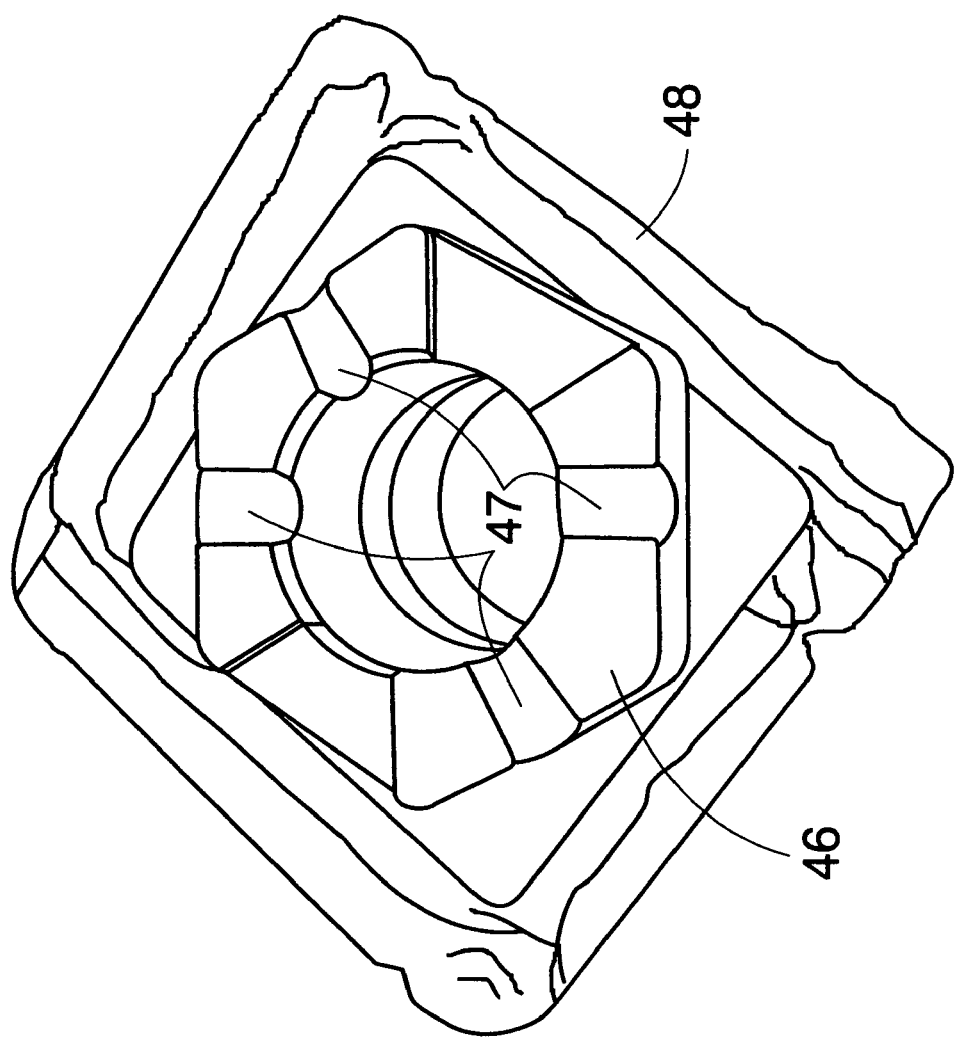
FIG. 7 is a detailed top perspective view of a single drainage outlet showing a notched poly nut.
Figure 9:
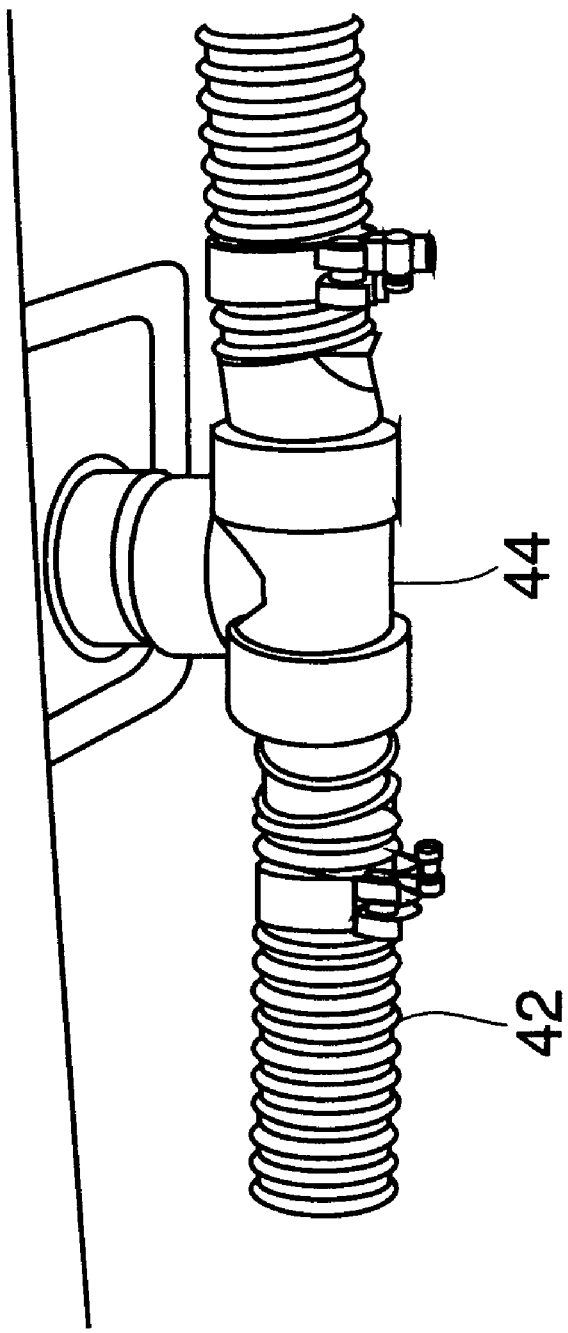
FIG. 9 is a perspective view of the bottom of the container showing the plastic drainage hoses.

A drainage system is positioned along the centerline beneath separator wall 26. It is noted that wall 26 need not extend the entire length of the container but may stop a foot or two short of the front of the container permitting fluid to slosh around from one side of the wall 26 to the other. The drainage system includes a corrugated plastic conduit 42 which receives drained liquid from a plurality of T-connectors 44 (FIG. 9, one shown) to allow the separated liquids to be removed from the container 20. A floor drain 45 is formed by poly nut 46 (FIGS. 6 and 7) inside container 20 is threaded into each T-connector 44. A recess 48 is formed to receive each poly nut 46 and each nut 46 is grooved as at 47 to allow liquids accumulating in recess 48 to drain into T-connector 44. Interior walls 24 and both sides of central wall 26 act as filters to transfer separated liquid into the hollow spaces in the walls and down the floor drains 45 at the center of the container (FIG. 6) and out of the container 20 (FIG. 9). The interior poly walls 24, 26 are a sandwich construction entirely of polyethylene materials, including a spacer material such as either poly grating 50 or poly cuspated plastic 52 or a combination thereof (FIG. 5) atop the poly sheet, and, then, a porous filter cloth 55, such as poly porous filter sheets, over the exterior. The porous poly filter sheets 55 are secured in place using a stainless steel strip 30 and stainless steel fasteners 32 (FIG. 4). Liquids passing through grating 50 or between the cusps of poly cuspated plastic 52 will find its way to the bottom poly sheet 54 (FIG. 6) where the liquid drains through T-nut connectors 44 into conduit 42.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

We claim:

1. A container used to effect solid phase-liquid phase separation of a slurry, said container comprising
   a) a metallic skeletal grid;
   b) a corrosion-resistant internal wall manufactured of polyethylene, said polyethylene wall forming a bottom surface and being secured to said metallic skeletal grid using corrosion-resistant fasteners;
   c) corrosion-resistant filter means for separating the liquid phase from the solid phase;
   d) conduit means positioned below said bottom surface, said conduit means including a plurality of T-connectors positioned below said bottom surface, said conduit means conveying the liquid phase out of said internal polyethylene wall, said conduit means further comprising a plurality of poly nuts inside said bottom surface interconnected to said plurality of T-connectors.

2. The container of claim 1 further comprising at least one partition formed within said corrosion-resistant internal wall, said partition being equipped with said corrosion-resistant filter means thereby increasing an area available for filtering and reducing a time needed to filter the liquid phase from the solid phase.

3. The container of claim 2 wherein said filter means includes a corrosion-resistant filter cloth and filter means positioned therebeneath selected from a group consisting of a polyethylene grate and a layer of polyethylene cuspated plastic and combinations thereof.

4. The container of claim 3 wherein said filter means further comprises a filter media associated with said filter cloth for restricting expulsion of solids through said filter cloth.

5. The container of claim 1 further comprising a hinged door forming one end of said container, said hinged door having secured thereto a corrosion-resistant inside wall and seal means to prevent leakage between said hinged door and a pair of side walls which said hinged door engages.

6. The container of claim 1 wherein said corrosion-resistant internal wall is made of high molecular weight polyethylene.

7. The container of claim 6 wherein said high molecular weight polyethylene is formulated to have particularly slippery surface characteristics.

8. The container of claim 1 further comprising a plurality of grooves in each upper surface of each poly nut to facilitate draining of liquid from said container.

* * * * *